United States Patent [19]

Comroe et al.

[11] Patent Number: 4,642,807
[45] Date of Patent: Feb. 10, 1987

[54] FAULT TOLERANT RECEIVER

[75] Inventors: Richard A. Comroe, Dundee; Adelore F. Petrie, Arlington Heights, both of Ill.

[73] Assignee: Motorola, Inc., Schaumburg, Ill.

[21] Appl. No.: 682,867

[22] Filed: Dec. 18, 1984

[51] Int. Cl.$^4$ .......................... G06F 11/00; H04L 1/00
[52] U.S. Cl. ........................................ 371/31; 371/22; 371/55; 371/57
[58] Field of Search ...................... 371/22, 31, 48, 55, 371/56, 57; 375/17; 340/825.16

[56] References Cited

U.S. PATENT DOCUMENTS

| | | | |
|---|---|---|---|
| 4,059,731 | 11/1977 | Green | 371/31 X |
| 4,247,937 | 1/1981 | Paesler | 371/31 X |
| 4,337,457 | 6/1982 | Tache | 375/17 X |
| 4,380,080 | 4/1983 | Rattlingourd | 375/17 |

FOREIGN PATENT DOCUMENTS 2777  1/1979  Japan ...................... 371/48

Primary Examiner—Jerry Smith
Assistant Examiner—Robert W. Beausoliel, Jr.
Attorney, Agent, or Firm—Steven G. Parmelee

[57] ABSTRACT

A fault tolerance signal receiver (10) for use with differential voltage level transmission systems from which two voltage levels may be substantially simultaneously sensed to allow the two voltage levels to be decoded into digital signals. The receiver (10) includes an input unit (11) for receiving the two voltage levels and for producing outputs related to these two voltage levels, a first logic unit (12) for receiving the output from the input unit and for producing an output, with the output being selectively variable when the two voltage levels are valid and non-variable when the two voltage levels are invalid due to the presence of a fault condition in the transmission system, and a second logic unit (13) for receiving the output of the first logic unit (12) and the input unit (11) for correctly outputting a decoded digital signal (17) provided that the transmission system has no more than one fault condition present thereon. A fault condition signal (27) may also be provided.

11 Claims, 4 Drawing Figures

FAULT TOLERANT RECEIVER

TECHNICAL FIELD

This invention relates generally to communications receivers, and more particularly to signal receivers that are used with twisted pair transmission lines.

BACKGROUND ART

Many electronically monitored and controlled systems, such as may be found in an automobile, are comprised of systems having a distributed architecture. More particularly, such systems comprise a collection of modules, and these modules typically run somewhat independently of one another, though a certain amount of intercommunication between the modules must be maintained. Rather than having a dedicated communications line between every two modules in a particular system, a single multiple access communications link will typically be substituted.

By using a single, serial, bi-directional, multiple access communication link, the required number of conductors can be minimized along with overall cost. By the same token, however, certain safeguards must be provided to minimize error or a mission disabling failure.

A typical prior art differential voltage transmission system as used with twisted pair transmission lines has been set forth in FIG. 1. This system includes a first resistor (R1) connected between a positive 5 volt source and the collector of an emitter grounded transistor (Q1). A second resistor (R2) connects between ground and the collector of another transistor (Q2) having its emitter connected to the positive 5 volt source. The bases of both transistors (Q1 and Q2) connect to appropriate triggering circuitry as well known in the art.

A comparator comprises the prior art receiver mechanism as indicated, and essentially subtracts the $V_2$ voltage as appears at the collector of the second transistor (Q2) from the $V_1$ voltage as appears at the collector of the first transistor (Q1). If CMOS devices are used and a supply voltage of +5 volts provided, then analog signals in excess of 2.5 volts will be accepted as logical 1's and signals below this threshold will be interpreted as logic 0's.

With reference to FIG. 2, it can be seen that when both transistors (Q1 and Q2) are turned off, $V_1$ will exceed the 2.5 volts threshold, and $V_2$ will fall short of the threshold. As a result, the difference between the two will be as indicated on the graph. As can be seen, a relative logic high can be easily distinguished from a relative logic low by the comparator when no fault conditions have occurred. In this way, then, serially transmitted digitally encoded data can be transmitted through the transmission system between various modules.

This prior art configuration provides very good common mode rejection of interference. Unfortunately, this structure does not tolerate certain fault conditions in the transmission system. Such fault conditions can be specifically defined and categorized as follows:

(1) The first transistor is constantly turned on;
(2) The second transistor is constantly turned on;
(3) The first transistor never turns on;
(4) The second transistor never turns on;
(5) The transmission line associated with the first transistor opens;
(6) The transmission line associated with the second transistor opens;
(7) The first transmission line shorts to the positive voltage source;
(8) The first transmission line shorts to ground;
(9) The second transmission line shorts to the positive voltage source; or
(10) The second transmission line shorts to ground.

Should any one of the above fault conditions occur, the prior art receiver will not be able to properly decode the incoming signals. To accomodate this problem to some extent, the prior art does suggest that redundant links, redundant drivers and even redundant receivers can be utilized. The provision of such redundant parts increases the cost of the system and, in the long run, may only postpone an inevitable and unexpected complete failure of the system.

A need therefore exists for a fault tolerant receiver that can receive and properly decode differential voltage level signals even though the transmission system may have suffered a fault condition.

SUMMARY OF THE INVENTION

The above needs are substantially met through provision of a fault tolerant signal receiver. This receiver includes an input unit, a first logic unit and a second logic unit. The input unit receives two differential voltage level signals comprising the transmitted data and produces at least one output related to these input signals. The first logic unit receives this output and produces an output that will produce a selectively variable output in accordance with the input signals when the originally input differential voltage level signals are valid. When these signals are invalid, the first logic means will output a non-variable signal. Finally, the second logic unit receives the output of the first logic unit and correctly decodes the intended digital signal; provided, that the transmission system has no more than one fault condition as defined above. If no more than one fault condition is present, then a correct decoding will result. If more than one fault condition exists, then an accurate result cannot be assured.

For purposes of this specification, the differential voltage level signals are "valid" when no fault condition exists in the transmission system. Conversely, such differential voltage level signals are "invalid" when a fault condition exists in the transmission system.

In one embodiment, the input unit can be comprised of two NAND gates. Each NAND gate has one non-inverting input and one inverting input. The first logic unit can be comprised of a flip-flop having its set port connected to the output of one of these NAND gates and its reset port connected to the output of the remaining NAND gate.

The second logic unit can be comprised of four NAND gates and an inverter. The outputs of the two NAND gates in the input unit connect to the inputs of the first NAND gate in the second logic unit. The output of this NAND gate connects to the input of the inverter and also to one input of a second NAND gate. The remaining input of the second NAND gate connects to the Q output of the flip-flop. The not Q output of the flip-flop connects to a third NAND gate, the remaining input of which connects to the output of the inverter. Finally, the outputs of the second and third NAND gates connect to the two inputs of the fourth NAND gate, and the decoded output can be obtained at the output of this fourth NAND gate.

During normal operation, and presuming no fault conditions, the flip-flop in the first logic unit will set and reset pursuant to a selectively variable response pattern in response to the incoming signals from the input unit, which signals are directly related to the incoming differential voltage level signals. The selectively variable output from the flip-flop can be utilized to provide a correctly decoded signal.

In the event of a single fault condition in the transmission system, the flip-flop will be forced into a default mode such that it will not alter its most previous output. In addition, the various gates noted above with respect to the second logic unit interpret the incoming distorted signal and, in concert with the default mode output of the flip-flop, provides a correctly decoded output.

So long as no fault conditions exist, the flip-flop will properly interpret the incoming signal and provide a correctly decoded output, which correct output the second logic unit will not compromise. Should a single fault condition exist, the output of the flip-flop will be held in a non-variable condition and the remaining circuitry of the second logic unit will serve to provide a correct decoded output in conjunction with the output of the flip-flop. If more than one fault condition occurs, then accuracy of the decoded signal cannot be assured.

In an enhanced embodiment, a driver and light emitting diode may be connected to the output of the inverter in the second logic unit to provide a visual indication that a fault condition has occurred. By this provision, an operator can be alerted that a partial failure of the system has occurred, even though the system as a whole will continue to operate unless and until a second fault condition occurs.

It should be noted that the fault tolerant receiver disclosed in this specification will not provide any common mode rejection of interference. Therefore, in a given particular application, it might be advisable to utilize both the prior art comparator decoding method in conjunction with the fault tolerant receiver of the instant specification. The outputs could then be compared or otherwise utilized to enhance accuracy of the decoding process.

BRIEF DESCRIPTION OF THE DRAWINGS

These and other benefits of the present invention will become more clear upon a thorough review and study of the following description of the best mode for carrying out the invention, particularly when reviewed in conjunction with the drawings, wherein.

BEST MODE FOR CARRYING OUT THE INVENTION

Figure 1:
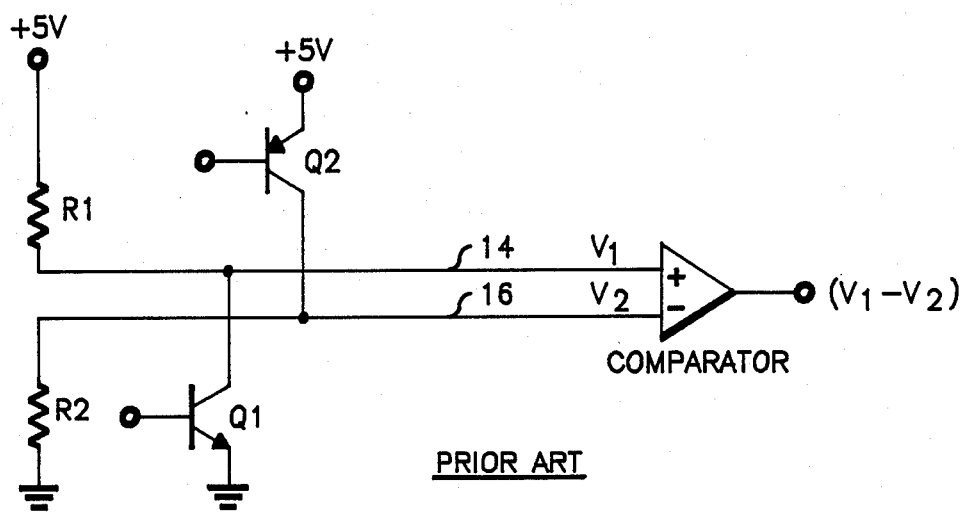
FIG. 1 comprises a schematic view of a prior art transmission system and receiver.
Figure 3:
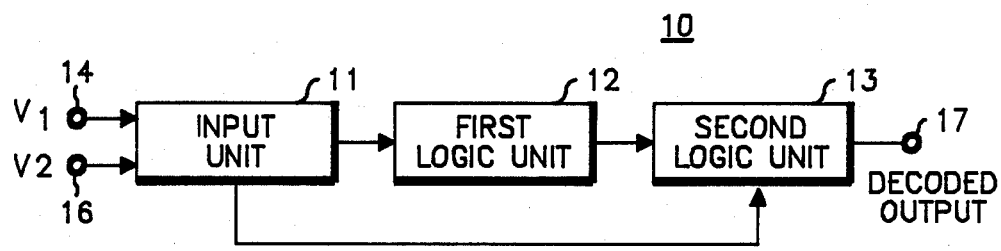
FIG. 3 comprises a block diagram depiction of the present invention.

Referring now to the drawings, and in particular to FIG. 3, the general components of the fault tolerant signal receiver can be seen as depicted in block diagram form as denoted generally by the numeral 10. The receiver (10) includes generally an input unit (11), a first logic unit (12), and a second logic unit (13). The input unit (11) has two inputs for receiving the differential voltage level signals ($V_1$ and $V_2$) from the transmission lines (14 and 16) system depicted in FIG. 1. The second logic unit (13) has an output (17) for providing a decoded output that relates to the differential voltage level signals.

Each of these generally described components will now be described in more detail in seriatim fashion.

Figure 4:
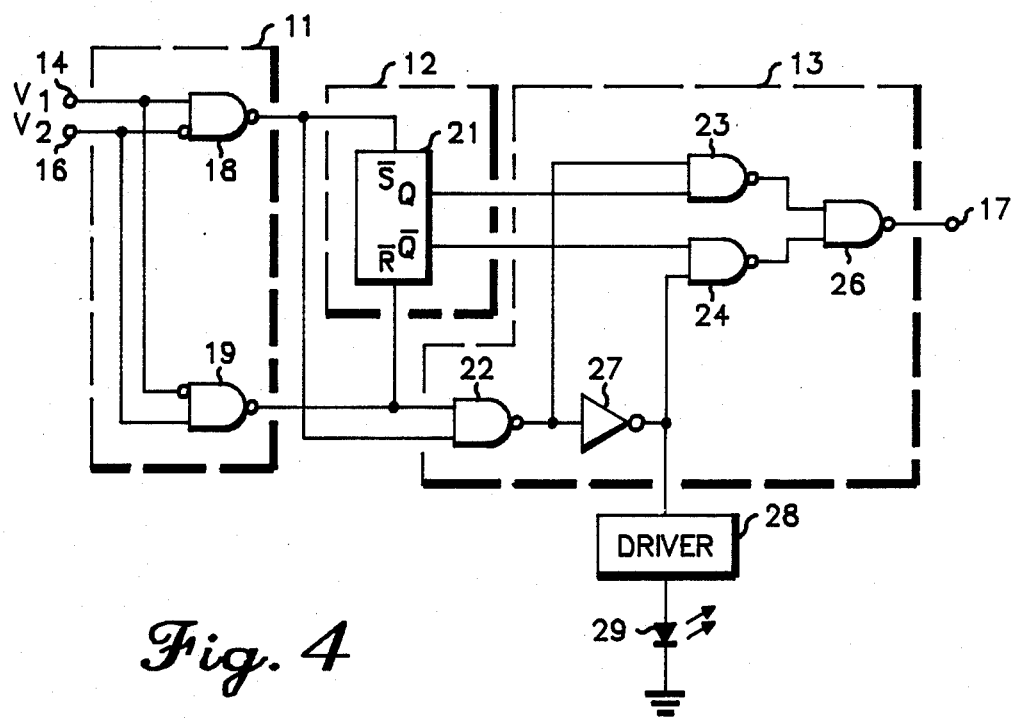
FIG. 4 comprises a schematic diagram of the present invention.

Referring to FIG. 4, the input unit (11) can be comprised of two NAND gates (18 and 19). Each NAND gate (18 and 19) has one non-inverting and one inverting input. The non-inverting input of the first NAND gate (18) and the inverting input of the second NAND gate (19) connect to the $V_1$ transmission line (14). The inverting input of the first NAND gate (18) and the non-inverting input of the second NAND gate (19) connect to the $V_2$ transmission line (16).

The first logic unit (12) may be comprised of a flip-flop (21) having its not S input connected to the output of the first NAND gate (18) and its not R input connected to the output of the second NAND gate (19). The two outputs of the flip-flop (21) connect to the second logic unit (13) as will be described in more detail below.

The second logic unit (13) includes four two input NAND gates (22, 23, 24, and 26) and one inverter (27). One input of the first NAND gate (22) connects to the output of the first NAND gate (18) in the input unit (11), and the remaining input of this same NAND gate (22) connects to the output of the second NAND gate (19) in the input unit (11). The output of this NAND gate (22) connects both to the input of the inverter (27) and also to one input of the second NAND gate (23) in the second logic unit (13).

The remaining input of the second NAND gate (23) connects to the Q output of the flip-flop (21) in the first logic unit (12). The not Q output of this flip-flop (21) connects to one input of the third NAND gate (24). The remaining input of this third NAND gate (24) connects to the output of the inverter (27).

The outputs of the second and third NAND gates (23 and 24) connect to the two inputs of the fourth NAND gate (26), the output (17) of which comprises the output of the second logic unit (13).

Finally, the output of the inverter (27) may also be connected through an appropriate driver circuit (28) to a light emitting diode (29) or other signalling device. The driver (28) can be comprised of any appropriate and well known driver circuitry, and hence need not be discussed in any greater detail.

The purpose of the transmission system is to transmit digital signals to one or more receivers that are able to decode the transmitted signals and provide an output of logic 1's and 0's. In this particular embodiment, it may be presumed that CMOS devices have been utilized, and that a supply voltage of +5 volts has been utilized. This being the case, any signal received by the input unit (11) that exceeds 2.5 volts will be interpreted as a high signal, and any signal less than this threshold value will be interpreted as a low signal.

Operation of the device in decoding valid signals (i.e., signals originating from a transmission system having no fault conditions) will now be described.

In accordance with prior art specifications, when both transistors (Q1 and Q2) in the driver units are off, a logic high should result as the decoded output of the comparator. As viewed in FIG. 2, when both transistors (Q1 and Q2) are off, and no faults exist, $V_1$ will exceed 2.5 volts and $V_2$ will be less than 2.5 volts. Hence, a logic 1 will appear on the non-inverting input of the first NAND gate (18) and on the inverting input of the second NAND gate (19) of the input unit (11), and a logic 0 will appear on the inverting input of the first NAND gate (18) and on the non-inverting input of the second NAND gate (19).

With these relative inputs, the output of the first NAND gate (18) will be a logic low and the output of the second NAND gate (19) will be a logic high. Consequently, a logic low will be presented to the not S input of the flip-flop (21) and a logic high will be presented to the not R input. Similarly, a logic high and logic low will be presented at the two inputs, respectively, of the first NAND gate (22) in the second logic unit (13), with a resulting logic high appearing at the output of that NAND gate (22).

With a logic low at the not S input and a logic high at the not R input of the flip-flop (21), a logic high will appear at the Q output port and a logic low will appear at the not Q output port thereof. The output of the inverter (27) will be a logic low. Therefore, the inputs to the second NAND gate (23) will both be logic high and the inputs to the third NAND gate (24) will both be a logic low. As a result, the output of the second NAND gate (23) will be a logic low and the output of the third NAND gate (24) will be a logic high. With these inputs to the fourth NAND gate (26), the decoded output will be a logic high as desired. The receiver (10) therefore can properly decode this particular differential voltage level signal from the transmission system.

Figure 2:
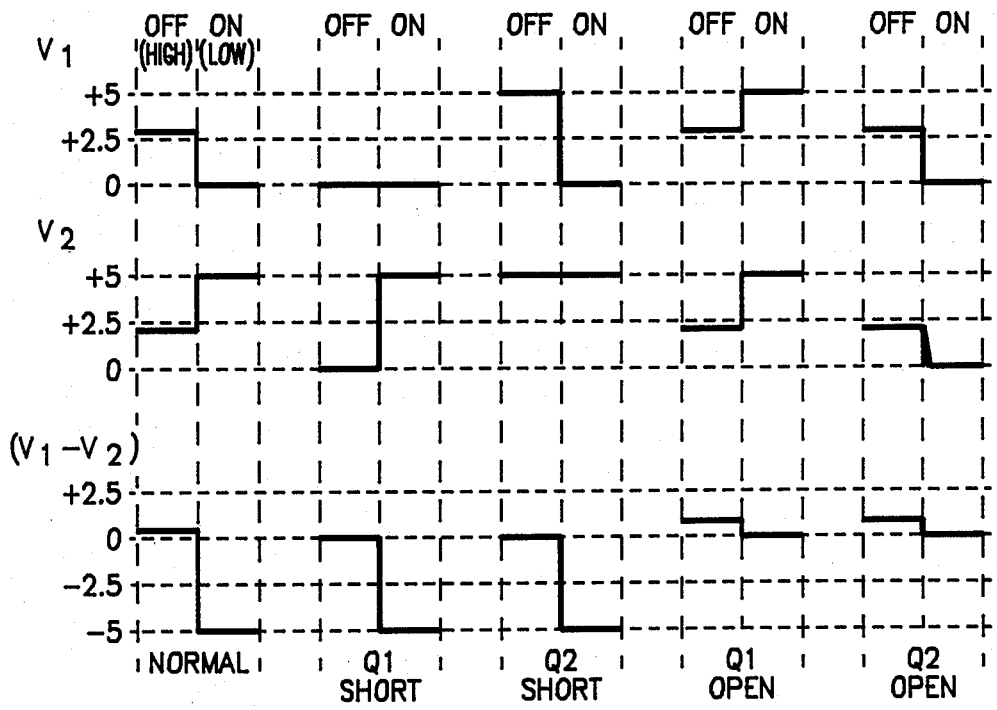
FIG. 2 comprises a graph of various normal and abnormal voltage readings on a transmission system.

When both transistors (Q1 and Q2) of the transmission system are on, a logic low will appear at the decoded output of the comparator in the prior art system. With reference to FIG. 2, it can be seen that when both transistors (Q1 and Q2) are on, $V_1$ will be zero and $V_2$ will be 5 volts. Hence, the inputs to the two NAND gates (18 and 19) of the input unit (11) as described above will be the opposite of that set forth above. Similarly, the outputs of both NAND gates (18 and 19) will be the opposite of that described above, such that the output of the first NAND gate (18) will be a logic high and the output of the second NAND gate (19) will be a logic low.

This being the case, the not S input to the flip-flop (21) will be a logic high and the input to the not R input will be a logic low. Although the inputs to the first NAND gate (22) of the second logic unit (13) will be the opposite of that described above, there will still be one logic low and one logic high at the inputs, such that the output will be a logic high and the output of the inverter (27) will again be a logic low.

With the inputs described above, the Q output of the flip-flop (21) will now be a logic low and the not Q output will be a logic high. Therefore, the two inputs to the second NAND gate (23) of the second logic unit (13) will be a logic high and a logic low, and the inputs to the third NAND gate (24) will also be a logic high and a logic low. As a result, both NAND gates (23 and 24) will output a logic high, and these outputs will force a logic low output from the fourth NAND gate (26).

This logic low of course comprises the desired output, and hence it can be seen that the receiver (10) will properly decode either an intended logic low or logic high signal from a transmission system having no fault conditions.

Now, operation of the receiver (10) will be described with a single fault condition impairing the transmission capabilities of the transmission system.

As mentioned above, Q1 and Q2 are ordinarily both turned off in order to obtain a logic high at the decoded output. Under normal conditions, when both Q1 and Q2 are off, $V_1$ will present a logic high and $V_2$ will present a logic low to the input unit (11). When Q1 has been shorted to ground, however, as constitutes one of the enumerated fault conditions, $V_1$ will be zero and $V_2$ will be zero, and hence both inputs to both NAND gates (18 and 19) of the input unit (11) will be logic low. Such inputs will generate a logic high at the output of both NAND gates (18 and 19) with the result that a logic high is presented at both the not S and not R input of the flip-flop (21) and at the two inputs of the first NAND gate (22) of the second logic unit (13).

When a flip-flop has such inputs, the output states will not be changed from the last valid output states, such that in this case, a logic low will be presented at the Q output and a logic high will be presented at the not Q output. The output of the first NAND gate (22) of the 2nd logic unit (13) will now be low, and the inverter (27) will output a logic high. As a result, the second NAND gate (23) in the second logic unit (13) will have logic low at both of its inputs and the third NAND gate (24) will have logic high at both of its inputs. Consequently, the output of the second NAND gate (23) will be a logic high and the output of the third NAND gate (24) will be a logic low, thereby forcing a logic high from the output of the fourth NAND gate (26), this of course being the desired decoded output.

Also as mentioned above, when a logic low is desired, both transistors are to be turned on. With respect to FIG. 2, it can be seen that when Q1 has been shorted to ground, that $V_1$ will be zero and $V_2$ will be +5, such that the $V_1$ input will be interpreted as a logic low and the $V_2$ input will be interpreted as a logic high. This input state, however, coincides with the correct logic input for obtaining a logic low at the decoded output, and hence the receiver (10) will decode it as described above when a logic low has been presented at the $V_1$ input and a logic high is presented at the $V_2$ input.

The receiver (10) will similarly correctly decode all of the other enumerated fault conditions, such that regardless of whether the transmission system has no faults or one fault condition, a correctly decoded output can be obtained.

In essence, the input unit (11) properly interprets and decodes the incoming analog signals into digital equivalents, and further processes these logic signals through logic gates. The flip-flop (21) of the first logic unit (12) provides a selectively variable output when the two input voltage levels constitute valid entries. When the two voltage levels are invalid, i.e., the voltage differential level signal constitutes one that would not exist in a properly functioning system, the output of the flip-flop becomes non-variable and the second logic unit (13) ensures that a correctly decoded signal results despite the existence of the fault condition.

The receiver (10) will not correctly decode with any assurance a signal from a transmission system having more than one fault condition. Therefore, it may be appropriate to provide an indicia or control signal to indicate when one fault condition does exist. The driver (28) and LED (29) have been provided to serve this purpose. It will be appreciated that when only valid input signals are present at the input unit (11), a logic low will be the resulting output of the inverter (27). When invalid signals are present, however, a logic high will be the resulting output, and this change in state can be utilized to trigger the driver (28) and ignite the LED (29) to alert an operator that, although the receiver (10) continues to correctly decode the incoming signals, one fault condition does exist and that a second one would result in potentially compromised data.

Those skilled in the art will recognize that the essential concepts put forth above could be achieved through a variety of embodiments, and the particular embodiment set forth should not be viewed as limiting unless specifically so provided in the claims appended hereto.

We claim:

1. A fault tolerant signal receiver for use with differential voltage level transmission systems from which at least two voltage levels may be substantially simultaneously sensed to allow said at least two voltage levels to be decoded into digital signals, said receiver comprising:
   (a) input means for receiving said two voltage levels and for producing at least one output related to said two voltage levels;
   (b) first logic means for receiving said output from said input means and for producing an output, said output being selectively variable when said two voltage levels are valid and non-variable when said two voltage levels are invalid; and
   (c) second logic means for receiving said output of said first logic means and for correctly outputting said decoded digital signal, provided, that said transmission system has no more than one fault condition.

2. The receiver of claim 1 wherein said second logic means includes a first gate unit having at least one input connected to the output of said input means and a second gate unit having at least one input connected to an output of said first gate unit and to the output of said first logic means.

3. The receiver of claim 2 wherein said input means includes:
   first gate means for receiving said two voltage levels and for producing a first output related to said two voltage levels; and
   second gate means for receiving said two voltage levels and for producing a second output related to said two voltage levels.

4. The receiver of claim 1 wherein said non-variable output of said first logic means equals a last selectively variable output at last output by said first logic means when said two voltage levels were last valid.

5. The receiver of claim 4 wherein said first logic means comprises a flip-flop.

6. The receiver of claim 4 wherein said input means includes:
   first gate means for receiving said two voltage levels and for producing a first output related to said two voltage levels; and
   second gate means for receiving said two voltage levels and for producing a second output related to said two voltage levels.

7. The receiver of claim 6 wherein said second logic means includes first gate means having at least one input connected to the output of said input means, said first gate means of said second logic means having an output that is constant when said two voltage level inputs are valid and that is a different constant when said two voltage levels are invalid.

8. The receiver of claim 1 wherein said second logic means includes fault detect means for detecting the existance of at least one fault condition in said transmission system.

9. The receiver of claim 8 and further including signal means responsive to said fault detect means for providing a fault condition signal.

10. The receiver of claim 9 and further including visible signal means responsive to said fault condition signal for providing a visible signal when said transmission system has at least one fault condition.

11. A fault tolerant signal receiver for use with a two line differential voltage level transmission system from which two voltage levels may be substantially simultaneously sensed to allow said two voltage levels to be decoded by said receiver into digital signals, said transmission system including a first driver connected to one of said lines and a second driver connected to the remaining line, said receiver comprising:
   (a) input means for receiving said two voltage levels, digitally interpretting said two voltage levels, and for providing two digital outputs related to said two voltage levels;
   (b) first logic means for receiving said two outputs of said input means, and for providing two outputs, such that:
      (i) said two outputs will vary in accordance with a preestablished pattern when said two digital outputs from said input means are recognized by said first logic means as valid; and
      (ii) said two outputs will not vary from a last provided output as based upon validly recognized output from said input means when said two digital outputs from said input means are recognized by said first logic means as invalid;
   (c) second logic means for receiving said two outputs of said input means, and for receiving said two outputs of said first logic means, for interpreting said outputs and for providing an output of correctly decoded digital signals related to said two voltage levels, provided that said transmission system has no more than one fault condition.

* * * * *